United States Patent [19]

Cooper et al.

[11] Patent Number: 4,630,163
[45] Date of Patent: Dec. 16, 1986

[54] METHOD AND APPARATUS FOR A TRANSIENT-SUPPRESSION NETWORK

[75] Inventors: Howard C. Cooper, Kaysville; Carl M. Rasmussen, Fruit Heights; Perry N. Law, Kaysville, all of Utah

[73] Assignee: EFI Corporation, Salt Lake City, Utah

[21] Appl. No.: 696,998

[22] Filed: Jan. 31, 1985

Related U.S. Application Data

[63] Continuation-in-part of Ser. No. 414,390, Sep. 2, 1982, abandoned.

[51] Int. Cl.⁴ .............................................. H02H 3/20
[52] U.S. Cl. ....................................... 361/56; 361/89; 361/91; 361/111; 361/118; 361/120
[58] Field of Search ................................ 361/54–56, 361/91, 111, 113, 118, 119; 333/12, 202, 119, 172; 363/39, 47

[56] References Cited

U.S. PATENT DOCUMENTS

| | | | |
|---|---|---|---|
| 3,109,134 | 10/1963 | Induni | 321/11 |
| 3,290,578 | 12/1966 | Ainsworth | 321/9 |
| 3,332,000 | 7/1967 | Greening et al. | 318/345 |
| 3,372,285 | 3/1968 | Blazek et al. | 361/56 X |
| 3,501,686 | 3/1970 | Tveteras et al. | 321/9 |
| 3,517,265 | 6/1970 | Bradford | 317/51 |
| 3,793,535 | 2/1974 | Chowdhuri | 307/202 |
| 3,890,543 | 6/1975 | Jonassen | 317/16 |
| 4,021,759 | 5/1977 | Campi | 333/70 |
| 4,023,071 | 5/1977 | Fussell | 361/56 |
| 4,089,032 | 5/1978 | Dell Orfano | 361/56 |
| 4,181,921 | 1/1980 | Taylor et al. | 361/56 |
| 4,198,613 | 4/1980 | Whitley | 333/181 |
| 4,217,618 | 12/1980 | Kellenbenz et al. | 361/111 X |
| 4,271,446 | 6/1981 | Comstock | 361/111 X |
| 4,328,523 | 5/1982 | Seguin | 361/56 |
| 4,455,586 | 6/1984 | McCartney | 361/56 |
| 4,584,622 | 4/1986 | Crosby et al. | |
| 4,587,588 | 5/1986 | Goldstein | |

FOREIGN PATENT DOCUMENTS 254758 3/1962 Australia .......................... 361/111

Primary Examiner—A. D. Pellinen
Assistant Examiner—A. Jonathan Wysocki
Attorney, Agent, or Firm—Workman, Nydegger & Jensen

[57] ABSTRACT

An electrical circuit and method for use in suppressing source and load-side transients appearing on a power-supply line. The circuit includes a high-speed clamping stage, a high-energy clamping stage, and a highly efficient LC filter for dissipating harmonic voltage and current caused by clamping the transient. A third clamping stage may be included so as to provide for common-mode suppression.

39 Claims, 19 Drawing Figures

IEEE - 587 CATEGORY B
IMPULSE, 1.2 x 50, 6000V, 500AMP
VERTICAL: 1000V/DIV.
HORIZONTAL: 10 MICROSEC/DIV.

EXAMPLE 1: SUPPRESSION
OF CATEGORY B IMPULSE
1.2 x 50
VERTICAL: 1000V/DIV.
HORIZONTAL: 10 MICROSEC/DIV.

EXAMPLE 2: SUPPRESSION
OF CATEGORY B IMPULSE
1.2 x 50
VERTICAL: 100V/DIV.
HORIZONTAL: 10 MICROSEC/DIV.

IEEE - 587 CATEGORY B
RINGWAVE, 0.5/100 KH$_z$
VERTICAL : 1000V/DIV.
HORIZONTAL : 10 MICROSEC/DIV.

EXAMPLE 3 : SUPPRESSION
OF CATEGORY B RINGWAVE
0.5 / 100 KH$_z$
VERTICAL : 1000V/DIV.
HORIZONTAL : 10 MICROSEC/DIV.

EXAMPLE 4 : SUPPRESSION
OF CATEGORY B RINGWAVE
0.5 / 100 KH$_z$
VERTICAL : 100V/DIV.
HORIZONTAL : 10 MICROSEC/DIV.

IEEE - 587 CATEGORY B
IMPULSE, 8 x 20, 6000V, 3000 AMPS
VERTICAL : 1000 V / DIV.
HORIZONTAL : 10 MICROSEC / DIV.

EXAMPLE 5 : SUPPRESSION
OF CATEGORY B IMPULSE
8 x 20, 3000 AMPS
VERTICAL : 1000V / DIV.
HORIZONTAL : 10 MICROSEC / DIV.

EXAMPLE 6 : SUPPRESSION
OF CATEGORY B IMPULSE
8 x 20, 3000 AMPS
VERTICAL : 100V / DIV.
HORIZONTAL : 10 MICROSEC / DIV.

METHOD AND APPARATUS FOR A TRANSIENT-SUPPRESSION NETWORK

This application is a continuation-in-part of U.S. patent application Ser. No. 414,390 filed Sept. 2, 1982, now abandoned.

BACKGROUND

1. Field of the Invention

This invention relates to devices and methods for preventing electrical disruption or destruction of electronic circuits and their components and, more particularly, to a novel apparatus and method for suppressing high-energy transients on electrical power lines, thus protecting electrical and electronic equipment.

2. The Prior Art

Over the last two decades the ways in which electrical energy may be purposefully applied in every day life have expanded greatly. Sophisticated computers organize, analyze, transmit, and store massive quantities of data; industrial machines are electronically controlled to delicate precision; radio and television stations automatically broadcast prerecorded programs; medical support systems, monitors, and instruments interpret, analyze, and report various data; and numerous home appliances provide necessities, comfort, and entertainment to families and individuals.

Because of electricity's wide application in our society, individuals, businesses, and governments have become increasingly dependent upon electrical energy and upon the continuous and proper functioning of electrical devices. Our society expends vast resources to acquire and operate useful electrical devices, and the temporary or permanent interruption of the services provided by such devices is both inconvenient and costly.

Assuming that an electrical circuit is well designed so as to minimize the possibility of circuit disruption under normal operating conditions, there are nonetheless some types of disturbances which may result in the temporary disruption, or even the destruction, of electronic circuit components such as large scale integrated circuits used in computers, microprocessors and the like. These disturbances result, in part, from the widespread use of electrical energy in our society, and may appropriately be considered as electrical pollution, roughly analogous, on an atomic level, to other forms of environmental pollution.

For convenience of discussion, electrical disturbances may be classified as one of three types: electrical noise, voltage sags or surges, and transients. Each of these types of disturbances is discussed briefly below.

Electrical noise, also sometimes referred to as "hash," results from random changes in voltage level. Voltage changes due to noise are not typically very large but they are fairly frequent, such that if a normal operational voltage level were plotted on a graph as a function of time, the voltage level would be represented by a "fuzzy" line instead of a sharp line. Noise in an electrical circuit may be caused by electromagnetic interference from nearby fluorescent lights, transformers, computers, car ignitions, radio and television transmissions, electrical storms or other sources of electromagnetic or radio-frequency signals.

Voltage sags or surges are a decrease or increase, respectively, of an AC voltage level for one or more voltage cycles. Sags or surges may originate from many sources, such as loose connections in a device, switches, power overloads, lightning, accidents, blackout and brownout corrections, short circuits, grounding, or operation of nearby electric motors and generators.

Transients are high-voltage pulses having an extremely fast rise time, typically on the order of a few nanoseconds, although some transients may last for a period of up to 10 milliseconds or even one-half of an AC voltage cycle. Typically they may reach a peak voltage of as high as 20,000 volts; however, transients which last for longer than 100 milliseconds, generally referred to as "spikes," do not typically exceed 6,000 peak volts. Transients may originate from many of the same sources mentioned above in connection with noise and voltage sags and surges. Some of the more common sources of transients are switches, short circuits, grounding, accidents, and electrical storms.

Each of these types of electrical disturbances may cause data errors, unscheduled downtime, circuit board failure, transistor failure, disruptive false commands, or loss of computer memory data. Extremely high voltages, mostly due to transients, may additionally cause insulation breakdown, "hot spot" melting of semiconductors, and the destruction of many delicate circuit components which in turn may necessitate costly service calls and repair time.

As the need for protecting electronic equipment from surges, spikes and transients (hereinafter collectively referred to as "transients") has increased, so has the need to set industry standards in this area. Organizations such as the Institute of Electrical and Electronics Engineers ("IEEE"), Underwriters Laboratories ("UL"), International Electrotechnical Commission ("IEC"), and the Federal Communications Commission ("FCC") have each promulgated standards concerning specifications of various simulated transient waveforms that equipment must survive. Of all the different standards, some of the most widely used and accepted are those promulgated by the IEEE.

The IEEE standard having the greatest applicability to the design and manufacture of devices for the protection of electronic equipment is IEEE Standard 587-1980 (hereinafter "IEEE-587"). IEEE-587 specifies the parameters of several simulated transient waveforms to be applied to the equipment under test in order to determine its ability to operate properly when subjected to severe transients.

One type of simulated transient specified in IEEE-587 is generally referred to as an impulse. An impulse waveform is unipolar and has an exponential rise and decay. FIG. 10 shows an oscilloscope trace of an impulse waveform. The waveform of FIG. 10 may be referred to as a 1.2×50 waveform. In this designation, which is common in the art, the first number indicates the rise time of the transient in microseconds, e.g., 1.2, and the second number indicates the duration to 50% decay of the transient in microseconds, e.g., 50.

The second type of simulated transient is generally referred to as an oscillatory or "ringwave" waveform. Oscillatory waveforms are characteristically sinusoidal waves having fast rise times to an initial peak which then decay. FIG. 11 is an oscilloscope trace of an oscillatory waveform which is characterized as 0.5/100 kHz waveform. The first number (0.5) indicates the rise time in microseconds. The second number (100 kHz) indicates the frequency of the oscillatory wave.

Under IEEE-587 different categories of simulated transients are used depending upon the installation of the equipment, as set forth below.

IEEE-587—CATEGORY A

When equipment is installed on a long branch circuit of a permanent wiring system far from a circuit breaker box, the waveform to be applied is an oscillatory waveform. The required parameters of an IEEE-587 Category A waveform are:

Peak voltage=6 kv
Oscillatory frequency=100 KHz
peak Current=200 A

IEEE-587—CATEGORY B

Category B waveforms are to be employed when equipment is installed near the circuit breaker box, e.g., short branch circuits and major feeders. Under Category B, equipment must be subjected to three different waveforms:

(I)

An oscillatory wave as shown in FIG. 11
having parameters of:
Peak voltage=6 Kv
Oscillatory frequency=100 kHz
Peak current=500 A.

(II)

An impulse waveform as shown in FIG. 10
having parameters of:
Peak voltage=6 Kv
Rise time=1.2 microsecond
50% decay=50 microsecond (III)

An impulse waveform as shown in FIG. 12
having parameters of:
Peak voltage=3 Kv
Rise time=8 microsecond
50% decay=20 microsecond Since the Category B waveforms (e.g., FIGS. 10–12) represent the most severe test for equipment, these waveforms are generally used when evaluating transient-suppression circuits. With standardized waveforms simulating "real-world" conditions, effective and reproducible tests and evaluations of transient-suppression devices can be carried out.

Several kinds of devices or circuits have been used in the prior art in an attempt to eliminate or reduce the effect of electrical disturbances as much as possible. One such approach is to use the DC power supply circuit which provides power to the particular electrical circuit or device to be protected. The power supply for most electrical circuits includes three stages. The first stage is a rectifier which changes the incoming AC power to pulsating DC power. Next, an LC filter (a filter comprising both an inductance and a capacitance) filters electrical noise from the incoming power line and smooths the pulsating DC power to pure DC power. A voltage regulator is included as the final stage to effectively regulate sags or surges in the incoming voltage. Thus, typical power supplies are usually designed to eliminate noise and voltage sags or surges occurring at the source or supply side of the circuit, although they do not eliminate the dangerous problem of fast, high-energy transients.

Other types of prior art devices used in an attempt to eliminate dangerous transients and electrical disturbances include various types of filters, such as LC networks, RC (resistance and capacitance) networks or isolation transformers. Such devices are not very cost effective because they duplicate, to a large extent, the kind of protection already provided by most types of power supplies, and they do not provide adequate protection against high-energy transients.

Other devices and methods used in the prior art include separate power feed lines, AC voltage regulators, motor generators, and constant voltage transformers. Some of these devices and methods, to a greater or lesser degree, also partially duplicate the function of a typical DC power supply. Although in varying degrees such devices may be somewhat effective in eliminating source-side transients, many of these devices are quite expensive both to purchase and to operate, and none of them effectively protects against load-side transients or disturbances. Consequently, high-voltage transients continue to disrupt electronic circuits in spite of the use of these costly protection devices. Moreover, such transients may also destroy or disrupt the above-described protection devices themselves, so as to reduce their capacity to work effectively.

Other prior art attempts to eliminate the problem of suppressing high-energy transients have also been developed. One such attempt has been to use a "gas tube" which is placed at the source or supply side of the circuit. As the voltage across the arc gap or gas tube rises above a predetermined level, the gas in the tube ionizes to the point that an electrical spark develops across the gap, thus discharging the rising voltage caused by the transient. When the gas tube ionizes, its internal resistance drops significantly, exhibiting in some cases a negative resistance, thus causing the voltage drop across the gas tube to also drop to, in some cases, less than 10 volts. This effect is often referred to in the art as a "crowbar" effect.

Although this device is still used in some applications, it has proven ineffective in many applications. First, a gas tube exhibits relatively slow response times. An arc gap or gas tube typically takes between ten microseconds to one millisecond to respond to a transient voltage surge which oftentimes may last for only a few nanoseconds. Thus, frequently transients occur too quickly for this type of device to even respond. Additionally, the gas tube, due to repeated ionization of the gas, becomes less sensitive to voltage transients such that over a period of time, the tube discharges at progressively higher voltages, thereby providing progressively lower levels of protection to the circuit.

Furthermore, the "crowbar" effect has undesirable influences on the circuit in which it is installed. One such influence is that when the internal resistance of the gas tube drops, the power supply line rapidly sees a greater "load" possibly causing a voltage sag on the line. Another undesirable characteristic of a gas tube is that once the gas is ionized, it exhibits negative resistance characteristics and is difficult to turn off. When it does, the line sees a very erratic voltage for several cycles until it again smooths out.

The gas tube has been replaced in some applications by a solid state metal oxide varistor (MOV). In the MOV a metal oxide is placed between two wire leads. As the voltage across the metal oxide increases to a predetermined level, the metal oxide "breaks down" (i.e., becomes conductive) and current is conducted though the metal oxide so as to limit, or what is commonly referred to in the art as "clamp" the rising voltage to a safe level. The response time of the MOV is much faster than that of a typical gas tube. However, this response time has also proven to be too slow such that many transients reach their maximum voltage faster than the response time of an MOV, and may thus damage or disrupt the electrical system before the MOV responds.

The MOV, as a clamping device, avoids a major drawback of the gas tube, i.e., the possible voltage sag caused by the crowbar effect and power line loading. However, while the MOV is a significant improvement over the gas tube, it is nonetheless limited in its ability to protect electronic circuits from the dangerous effects of very high voltage, short duration transients. Moreover, by clamping the voltage transient, harmonic voltages are generated which, though not as severe as those generated by crowbar effect devices, may disrupt logic levels, data and normal operation of delicate circuit components contained on large scale integrated circuits or the like.

A more recent attempt to solve the problem of providing adequate circuit protection has led to the development and use of a device known as a silicon avalanche suppressor (SAS), of which one typical example is marketed by General Semiconductor Industries, Inc., under the trademark TRANSZORB. The SAS is a semiconductor Zener device which breaks down and conducts current when the voltage across the device reaches a predetermined level. The SAS has a very fast response time, typically less than one nanosecond, and is capable of effectively clamping voltage transients before they reach a destructive level. However, in spite of its fast response time, the SAS has limited current capability and thus has a tendency to be destroyed when subjected to a high energy (e.g., high voltage and current) transient. Moreover, like the MOV, the clamping effect of the SAS tends to produce undesirable and potentially disruptive harmonic noise.

The fact that no single device adequately functions as a suppressor for all transients that may be encountered has lead to the development of what are known in the art as hybrid circuits. These hybrid circuits usually combine a crowbar type device such as a gas tube with a clamping device such as an MOV and/or SAS. Examples of such hybrid circuits can be found in U.S. Pat. No. 4,328,523, dated May 4, 1982, to Seguin and U.S. Pat. No. 4,023,071, dated May 10, 1977, to Fussel.

U.S. Pat. No. 4,328,523 (Seguin) entitled "Method and Apparatus for the Protection of Electrical Equipment from High Voltage Transients" discloses a transient-suppressor circuit utilizing a recoverable spark gap, an inductor, a capacitor and a varistor, and having as one of its objects to provide transient protection for a "down-well hole" submergible pump motor. In this circuit both a recoverable spark gap and MOV are connected to the power supply lines so as to be in parallel with the equipment to be protected. An inductor is inserted between the terminals of the spark gap and the MOV, and a capacitor is placed in parallel with the spark gap and MOV. In use, the circuit is designed so that the MOV is located on the load side of the inductor, the inductor acting to delay an incoming transient in order to allow the spark gap time to ionize.

While hybrid circuits such as the one described above may provide some increased protection from transients, several drawbacks accompany the use of such circuits. First, the circuit results in a crowbar effect when the spark gap ionizes. As previously mentioned, use of a gas tube will typically have the undesirable effect of loading the power supply and causing a voltage sag, as well as being difficult to turn off and causing further line disturbance when the gas tube recovers. Second, neither the spark gap nor the MOV operate quickly enough to suppress very fast transients that may be large enough to pass sufficient energy through the inductor to potentially damage the protected equipment. Third, such a circuit is not effective at suppressing oscillatory waveforms, such as those called for in the IEEE-587 Category A and B standards. Furthermore, while the circuit loading effect of an ionized gas tube may not be sufficient to physically harm delicate semiconductor devices, it may nonetheless disrupt digital logic levels causing data errors.

U.S. Pat. No. 4,023,071 (Fussel) entitled "Transient and Surge Protection Apparatus" discloses a circuit utilizing a gas tube, an MOV and a silicon avalanche suppressor connected in parallel across the power supply lines. However, this device does not use any crossover impedance in the circuit to either: (1) delay an incoming transient to provide adequate time for the gas tube or MOV to conduct; (2) limit an incoming transient seen by the SAS; or (3) attenuate or dissipate harmonic frequencies generated by the crowbar and clamping effects of the devices used in the circuit. In view of the above discussion it can be readily appreciated that major difficulties arise in protecting against high energy, high-speed transients, particularly those that are oscillatory in nature.

What is needed in the art is a transient-suppression circuit capable of responding in less than a nanosecond to effectively suppress high-voltage transients and which is also capable of effectively discharging large currents generated by high-energy transients without significantly disrupting the line voltage. The apparatus should further be capable of suppressing noise, including undesirable harmonic noise caused by suppressing the transient. It would also be an improvement in the art to provide a transient-suppression circuit which would effectively respond to both source and load side transients, i.e., a circuit which will suppress transients originating from sources external to the equipment to be protected and from transients generated internally in the equipment. Furthermore, it would be desirable to provide a transient-suppression circuit that would not only suppress transients that appear on the power supply lines, but also those appearing on the equipment ground line, which are known in the art as "common mode" transients.

BRIEF SUMMARY AND OBJECTS OF THE INVENTION

The present invention is directed to a method for effectively suppressing potentially disruptive and destructive transients without significantly disrupting line voltage on a supply line, and to an apparatus for a transient-suppression network which has a very fast response time (less than one nanosecond), a large current capability, and which greatly reduces extraneous noise over a wide band of frequencies, including harmonic noise generated when clamping a transient. In one presently preferred embodiment of the invention, the novel transient-suppression network comprises a high-speed suppressor stage for clamping transient voltage and which has a response time on the order of 800 picoseconds. A high-energy suppressor stage which clamps transient voltage is connected in parallel with the high-speed suppressor stage, and is designed to provide increased current dissipation capability. A current limiting circuit is connected in series with the high-speed suppressor stage and limits the current applied to the high-speed suppressor so as to allow the high-energy suppressor to discharge substantially all of the current as soon as the high-energy suppressor responds to the rising voltage transient. A voltage and current smoothing stage is connected in parallel with the high-speed suppressor and the high-energy suppressor so as to eliminate undesirable harmonic noise caused by clamping the transients and so as to absorb and dissipate radio frequency (RF) and electromagnetic interference (EMI).

In a second presently preferred embodiment of the invention, the transient-suppression network is configured as a hybrid network in which a primary clamping stage and a secondary clamping stage are placed in parallel between the hot and neutral lines of a supply circuit. The primary stage combines both high-energy suppression capability with very fast response times. The terminals at both ends of the primary and secondary clamping stages are connected through inductors which cooperate to provide exceptional reduction of harmonic noise and other line disturbances so as to minimize any adverse impact from the transient on the protected equipment. If desired, an optional stage may be included to provide common-mode suppression between the neutral and/or hot and ground lines.

It is, therefore, a primary object of the present invention to provide a method and apparatus for a transient-suppression network which responds at high speeds to transient voltage surges.

It is another object of the present invention to provide a method and apparatus for a transient-suppression network which is capable of discharging the current associated with high-energy transients without destruction of circuit components or significant disruption of line voltage.

It is a further object of the present invention to provide a method and apparatus for a transient-suppression network which will effectively respond to both source and load side transients.

It is a further object of the present invention to provide a method and apparatus for a transient-suppression network which will eliminate harmonic noise caused by clamping the transient.

It is still a further object of the present invention to provide a method and apparatus for a transient-suppression network which will suppress common mode transients.

It is another object of the present invention to provide a transient-suppression network which may be maintained and operated at low cost.

Still another object of the present invention is to provide an apparatus and method which not only effectively suppresses transients, but also combines highly efficient noise filtration over a wide band of frequencies.

These and other objects and features of the present invention will become more fully apparent from the following description and appended claims taken in conjunction with the accompanying drawings.

DETAILED DESCRIPTION OF THE PREFERRED EMBODIMENTS

The preferred embodiments of the invention will be best understood by reference to the drawings wherein like parts are designated with like numerals throughout.

Figure 1:
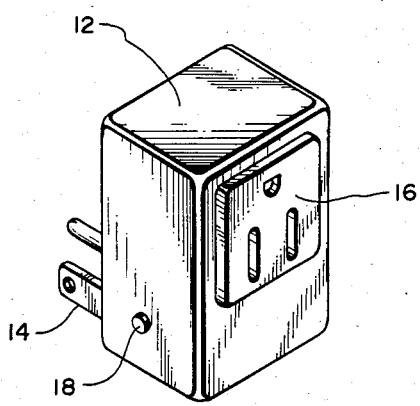
FIG. 1 is a perspective view of one presently preferred embodiment of a device which embodies the transient-suppression network of the present invention.

One presently preferred embodiment of a device which embodies the transient-suppression network of the present invention is illustrated in FIG. 1. The transient-suppression network, designated generally at 10 (see FIG. 2), is housed within a case 12. Case 12 may be formed of either metal or plastic by standard techniques which are well-known in the art. A plug 14 is formed on one side of case 12 so as to be capable of being inserted into a standard wall outlet. On an opposite side of case 12, a receptacle 16 is formed so as to allow the power cord from the load circuit 34 (see FIG. 2) to be plugged therein. The embodiment depicted in FIG. 1 also includes an indicator lamp 18 formed on the side of case 12 for purposes to be hereinafter more fully described.

In order to use the embodiment depicted in FIG. 1, plug 14 is inserted into a wall receptacle (not shown) and the AC power cord (not shown) from the load circuit 34 to be protected is inserted into receptacle 16. As will become apparent from the discussion which follows, transient-suppression network 10 is now connected in parallel with the AC power source which drives the load circuit 34. Indicator lamp 18, as will also become more fully apparent from the discussion which follows, will become illuminated in the event that any of the components of the transient-suppression network 10 cease to operate properly, and thereby become shorted out.

Figure 2:
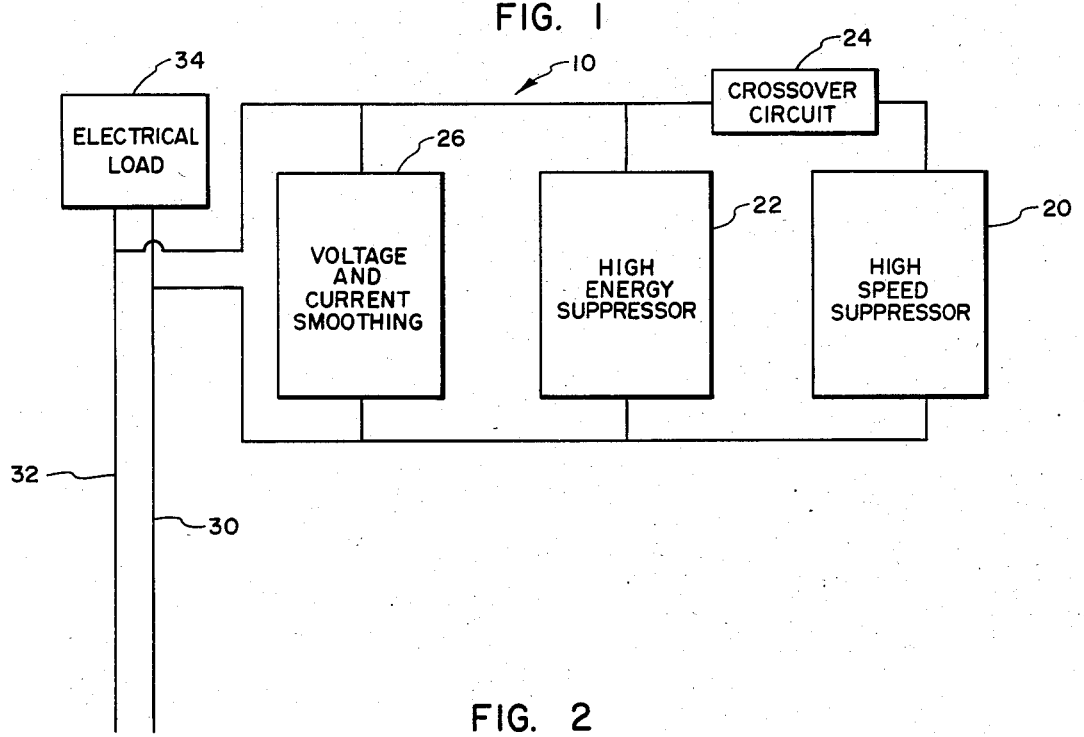
FIG. 2 is a block diagram generally illustrating one presently preferred circuit for implementing the method and apparatus of the present invention.

Referring now more particularly to FIG. 2, the transient-suppression network 10 is comprised of three main stages: a high-speed suppressor stage 20, a high-energy suppressor stage 22, and a voltage and current-smoothing stage 26. Each stage is connected in parallel to the AC power lines 30 and 32 which supply power to an electrical load 34. Load 34 may be, for example, a computer, telephone or communications equipment, CAD/CAM equipment, a hospital life support system, or any other electrical load.

Unlike the prior art type circuits which typically employ a crowbar type device in combination with a clamping-type device, high-speed suppressor 20 and high-energy suppressor 22 both function to clamp the voltage transient at a predetermined safe level. Specifically, the high speed, time-responsive suppressor stage 20 is designed to respond very quickly (i.e., in less than one nanosecond) to clamp transient voltage surges. High energy suppressor 22 is designed so as to also clamp the voltage and so as to be capable of discharging very large currents (i.e., up to 20,000 peak amps), thus dissipating large levels of transient energy. High-energy suppressor stage 22 need not respond to transients as quickly as high-speed suppressor circuit 20. However, it is preferred that high-energy suppressor stage 22 respond to and clamp transient voltages above the predetermined safe voltage level within approximately 50 nanoseconds.

Crossover circuit 24 is connected in series with the high-speed suppressor stage 20. The crossover circuit 24 serves to limit the transient current applied to high-speed suppressor stage 20, thereby preventing its destruction. When a transient appears in the system, high-speed suppressor stage 20 will quickly respond to clamp the voltage at the predetermined safe voltage level. Some of the energy present in the transient will be initially dissipated in crossover circuit 24, and as the high-energy suppressor 22 begins to respond, the crossover circuit 24 and high-energy suppressor stage 22 will dissipate most of the energy generated by the transient.

The voltage and current smoothing stage 26 is connected in parallel with the high-energy suppressor stage 22 and functions to eliminate harmonic noise caused by clamping the voltage of the transient at the predetermined safe voltage level. Voltage and current-smoothing circuit 26 also dissipates energy which may be present in the circuit due to radio frequency or electromagnetic interference.

Figure 3:
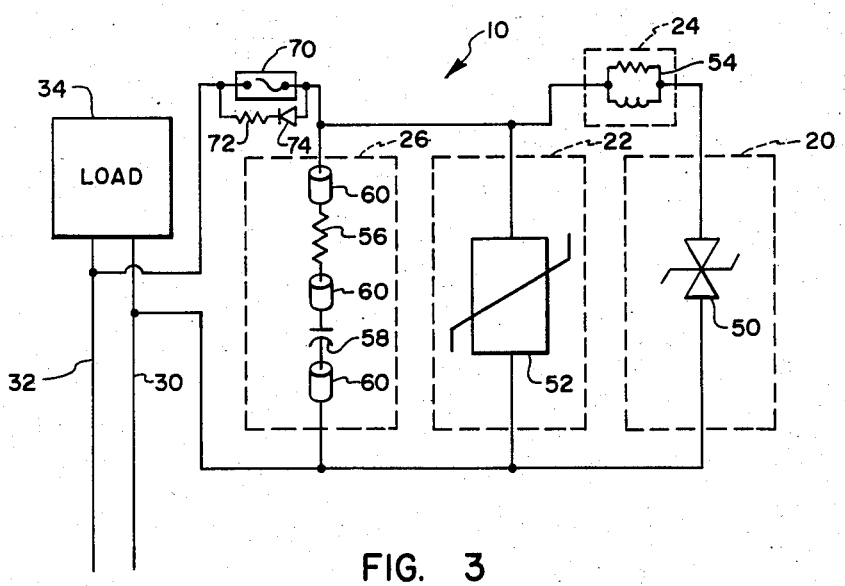
FIG. 3 is a detailed schematic diagram of an electronic circuit which embodies the block diagram generally illustrated in FIG. 2.

Reference is next made to FIG. 3 which illustrates in more detail an electrical schematic diagram for implementing the block diagram of FIG. 2. It will be appreciated that modifications to the detailed schematic diagram shown in FIG. 3 may be made without departing from the essential characteristics of the invention as described in connection with the block diagram of FIG. 2. Thus, the following description of the detailed schematic diagram shown in FIG. 3 is intended as an example only, and simply illustrates one presently preferred embodiment of an electronic circuit that embodies the invention as claimed herein. The various circuit stages in FIG. 3 corresponding to each of the functional elements of the block diagram of FIG. 2 are outlined in the schematic diagram by dashed lines and are numbered with like numerals.

As shown in FIG. 3, high-speed suppressor stage 20 may comprise a silicon avalanche suppressor (SAS) 50 or any other suitable high-speed voltage clamping device or circuit. A suitable SAS 50 is manufactured by General Semiconductor Industries, Inc., part number 1.5KE220CA, which has a reverse standoff voltage of 185 volts and is capable of conducting up to 4.6 amps. SAS 50 may clamp voltage transients at a level up to 328 volts, and it has a response time on the order of 800 picoseconds.

High-energy suppressor stage 22 may comprise an MOV 52. In one presently preferred embodiment, MOV 52 is a silicon-oxide varistor manufactured by Siemens, part number SIOK130, and can conduct up to 6500 peak amps at an average power dissipation of 1.00 watts. The MOV 52 of this embodiment may clamp the voltage at a level up to as high as 340 volts and has a response time on the order of 30 nanoseconds. It will be readily appreciated that other suitable varistors or other comparable high-energy suppression devices or circuits could be used.

Crossover circuit 24 may comprise a wire-wound resistor 54 which is characterized as a resistance in parallel with an inductance. Resistor 54 limits both the current and the voltage applied to the SAS 50. Resistor 54 may be of any suitable size, but in the presently preferred embodiment is a 1 ohm, 5 watt resistor.

Voltage and current smoothing circuit 26 may comprise resistor 56 and capacitor 58 which are connected in series across the high speed and high-energy suppressors 20 and 22. Resistor 56 and capacitor 58 form an RC circuit which filters out undesirable harmonic noise caused by the voltage clamping of SAS 50 and MOV 52. In the presently preferred embodiment resistor 56 may be a 33 ohm, 1 watt resistor and capacitor 58 may be a one microfarad, 330 volt AC (900 volt DC) capacitor.

As shown in FIG. 3, ferrite beads 60 are placed at the ends of each element in the RC circuit formed by resistor 56 and capacitor 58. Ferrite beads 60 absorb radio frequency or electromagnetic interference. Thus, ferrite beads 60 work to smooth the current through the circuit while resistor 56 and capacitor 58 smooth the voltage.

In order to additionally protect the electrical load 34, a fuse circuit may be used in conjunction with the basic transient-suppression network of the present invention. As illustrated in FIG. 3, the fuse circuit may be connected to the AC power line 32 in series with either leg of suppression network 10. The fuse circuit may conventionally comprise a fuse 70 or other suitable device such as a circuit breaker connected in parallel with resistor 72 and light-emitting diode (LED) 74. When the fuse 70 blows, diode 74 will be energized, thus indicating that fuse 70 has tripped. The preferred embodiment illustrated in FIG. 3 utilizes a 250 volt, 1 amp slow-blow fuse, a 10K ohm, 1 watt resistor and an AND714R light-emitting diode.

The transient-suppression network illustrated in FIG. 3 will, when connected to the AC power lines 30 and 32 of load circuit 34, protect load circuit 34 from both source and load transients. When a high-voltage transient appears SAS 50 will respond within 800 picoseconds and clamp the transient voltage, thus limiting it to the specified maximum safe voltage level. Wire wound resistor 54 will dissipate some of the energy caused by the transient and will limit the voltage and current through SAS 50 so as to prevent its destruction. Within approximately 30 nanoseconds, varistor 52 will respond. Due to the presence of the current-limiting resistor 54, substantially all of the current which is generated by the transient will be dissipated through MOV 52 and resistor 54. Since MOV 52 is rated for high-energy dissipation, large currents generated by the transient will not cause the destruction of MOV 52. Harmonic voltages which are caused by clamping the transient will be smoothed and dissipated by resistor 56 and capacitor 58. Additionally, any harmonic currents present in the system will be dissipated in ferrite beads 60. Thus, the transient-suppression network illustrated in FIG. 3 effectively suppresses high-voltage transients while eliminating unwanted harmonic noise.

In the event that SAS 50, MOV 52, wire-wound resistor 54, resistor 56, or capacitor 58 become inoperable and shorted the main AC power current will flow through fuse 70. When the current for fuse 70 exceeds 1 amp, fuse 70 will blow and will cease to conduct, and light-emitting diode (or other suitable indicator) 74 will then be illuminated. Light emitting diode 74 in FIG. 3 corresponds to indicator lamp 18 in FIG. 1 and may thus be observed by the user of the transient-suppression network to determine that a breakdown of the network has occurred.

Figure 4:
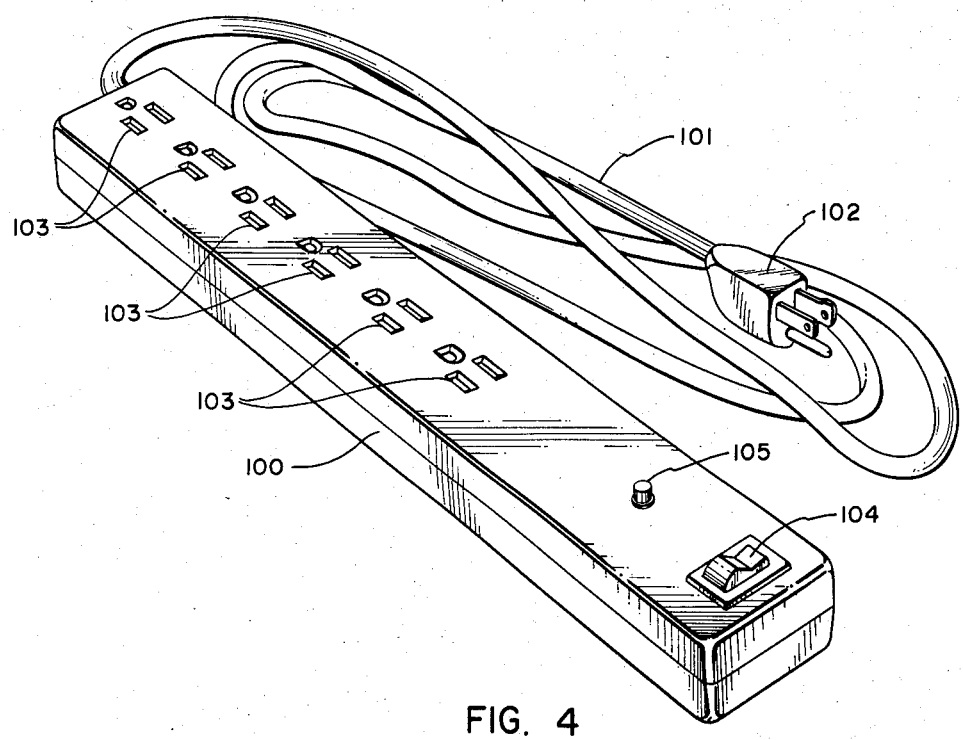
FIG. 4 is a perspective view of a second embodiment of a device which embodies the transient-suppression network of the present invention.

A second embodiment of a device which embodies the transient-suppression network of the present invention is illustrated in FIG. 4. In this embodiment, the transient-suppression circuit (see FIG. 5) is housed within a case 100. As in the first presently preferred embodiment, case 100 may be formed of plastic or other suitable fireproof, shock resistant materials well known in the art. The device is connected to a standard wall outlet by a power cord 101 with a plug 102. The incoming power is applied to the transient-suppression circuit and the conditioned (treated) power is output at a plurality of standard outlets 103 so as to allow power to be supplied through each outlet 103 to the various items of electrical equipment to be protected. The circuit is turned on or off by switch 104. An indicator lamp 105 is also provided to show when a circuit component has failed.

Figure 5:
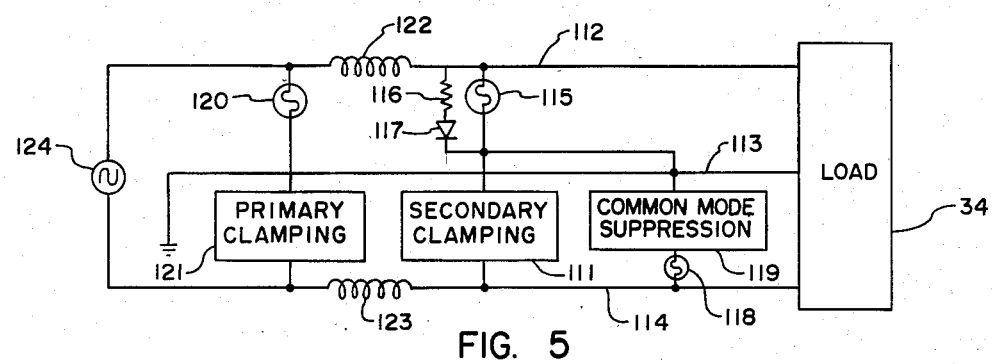
FIG. 5 is a block diagram generally illustrating another presently preferred circuit for implementing the method and apparatus of the present invention.

Referring to FIG. 5, the suppression network for the embodiment of FIG. 4 is principally comprised of three stages: a primary clamping stage 121, a secondary clamping stage 111, and a common mode suppression stage 119. These three stages, in conjunction with inductors 122–123, provide both transient-suppression and noise reduction.

The primary clamping stage 121 and the secondary clamping stage 111 are both connected across the hot, or higher potential, power supply line 112 and the neutral, or lower potential, power supply line 114. The common-mode transient-suppression stage 119 is connected between the equipment ground line 113 and either the hot or neutral lines 112 or 114, as hereinafter more fully explained. The terminal nodes, i.e., the input and output nodes of the primary and secondary clamping stages 121 and 111 are connected together by inductors 122 and 123 which are in series with the hot and neutral power lines 112 and 114.

With continued reference to FIG. 5, primary and secondary clamping stages 121 and 111 are each connected at their input terminal to a fuse 120 and 115, respectively. Similar to the embodiment previously described in connection with FIG. 3, a resistor 116 and a light-emitting diode 117 may be connected in parallel across each fuse as illustrated in connection with fuse 115 thereby providing visual indication in the event of a breakdown in any of the circuit components. A fuse 118 is also connected between the neutral conductor 114 and the common-mode suppression stage 119.

Figure 6:
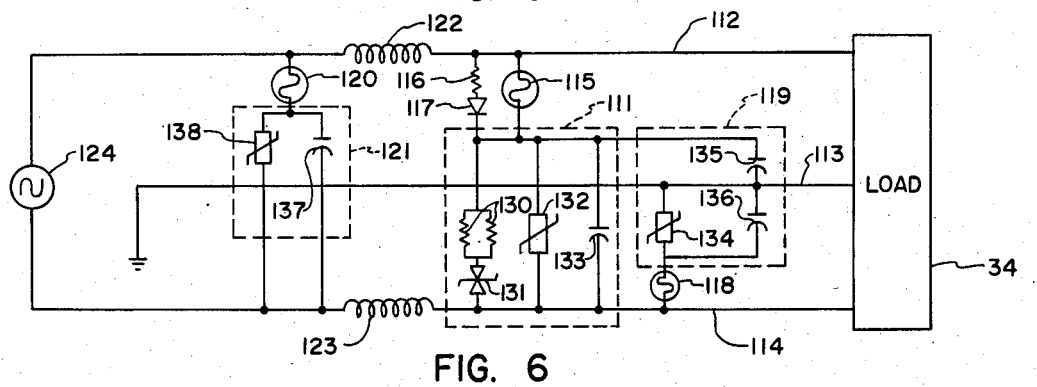
FIG. 6 is a detailed schematic diagram of an electronic circuit which embodies the block diagram generally illustrated in FIG. 5.

Reference is next made to FIG. 6 which illustrates in more detail an electrical schematic diagram for implementing the block diagram of FIG. 5. As in the case of FIGS. 2 and 3, the various circuit stages in FIG. 6 corresponding to each of the functional elements of the block diagram of FIG. 5 are outlined in the schematic diagram of FIG. 6 by dashed lines and are numbered with like numerals.

As shown in FIG. 6, the primary clamping stage 121 may comprise an MOV 138 connected in parallel across a capacitor 137. As in the case of FIG. 3, in the presently preferred embodiment the MOV is a Siemens SIOK130, and the capacitor 137 is a 400 volt 2.2 microfarad capacitor. The fuse 120 may comprise a 4 amp fuse wire.

The secondary clamping stage 111 may comprise three suppression elements connected in parallel. The first element consists of a silicon avalanche suppressor 131 connected in series with two resistors 130 connected in parallel with each other. In the presently preferred embodiment the SAS 131 may comprise a General Semiconductor Industries, Inc. 1.5KE220CA Transzorb (TM). Resistors 130 are each 10 ohm, 2 watt carbon resistors. A metal oxide varistor 132 connected in parallel across SAS 131 and resistors 130, and is identical to the MOV 138 used in the primary clamping stage 121. The capacitor 133 connected in parallel across the MOV 132 is preferably a 400 volt, 2.2 microfarad capacitor. Fuse 115, like fuse 120, is a 4-amp fuse wire and the resistor 116 is a 10 ohm, ¼ watt resistor connected in series with an AND714R light emitting diode, indicated at 117.

The common-mode suppression stage 119 consists of a metal oxide varistor 134 which may be a Siemens SIOV, S20K11 MOV, and which is connected in parallel with a capacitor 136. Capacitor 136 is a 1,000 volt AC, 0.01 microfarad capacitor. A second capacitor 135 is connected in series with the capacitor 136 and is also a 1,000 volt AC, 0.01 microfarad capacitor. Inductors 122 and 123 are 110 watt inductors which are wound using number 14 copper wire.

Figure 6A:
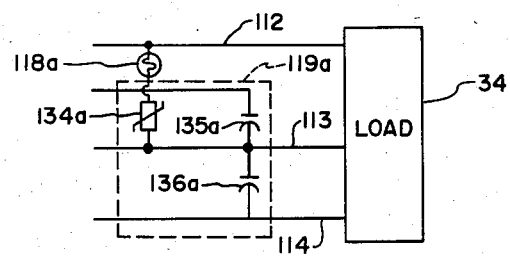
FIG. 6a is schematic diagram which illustrates an alternative circuit configuration for providing common-mode transient suppression.

An alternative configuration for the common-mode suppression stage 119 is illustrated in FIG. 6a. In FIG. 6a the only difference is that the MOV 134a has been connected in parallel between the hot conductor 112 and ground 113, rather than being connected between the neutral conductor and the ground as illustrated in FIG. 6. In the embodiment of FIG. 6 the MOV 134 is typically designed to clamp incoming transient voltages in excess of 20 volts which appear on the ground line 113. The capacitors 135 and 136 serve to filter noise and any harmonic voltages caused by the clamping action of the MOV 134. In contrast, in the embodiment of FIG. 6a, the MOV 134a must be designed to clamp at a level which is higher than the voltage level which appears on the hot conductor 112. Similar to FIG. 6, the capacitors 136a and 135a are provided to filter noise and harmonic voltages resulting from the clamping action of the MOV 134a.

In the embodiment of FIG. 6 the common-mode suppression stage 119 has the advantage that transients will be effectively suppressed by clamping the voltage at a relatively low level, which increases the range of protection. However, if the circuit is inadvertently plugged into the power supply line so that the terminals are reversed, thereby connecting the neutral conductor 114 to the hot conductor of the supply line, it may be possible for a leakage current to appear on the ground line 113. This problem can be solved using the configuration for the common-mode suppression stage 119a as shown in FIG. 6a. However, the embodiment of FIG. 6a also has a corresponding disadvantage in that since the MOV 134a must be set to clamp at a higher voltage level, the range of transient suppression is slightly decreased with respect to transients which may appear on the ground conductor 113.

In its operation, when the circuit of FIG. 6 senses a transient originating either on the side of the source 124 or on the side of the circuit at which the load 34 is connected, depending upon the type of transient either one or both of the clamping stages 121 and 111 will suppress the transient. In the case of a very fast transient, the secondary clamping stage 111 will react first. Resistors 130 will limit the current to the SAS 131 which will respond in typically 800 picoseconds. Additional suppression will be supplied by MOV 132 in the secondary clamping stage and/or by the MOV 138 provided in the primary clamping stage 121. The inductors 122 and 124 in combination with the capacitors 137 and 133 will also provide some suppression of energy and will also provide highly effective filtering and smoothing of harmonic voltages which may be caused by clamping the transient. Thus, very little disturbance will be seen on the power line 112 or neutral conductor 114. Even in the absence of a transient, inductors 122 and 123 in combination with capacitors 137 and 133 provide highly efficient noise filtration over a wide band of frequencies. For example, using the preferred embodiment as described in FIG. 6, a sinusoidal noise signal of 10 volts, peak-to-peak, was tested over a range of frequencies from 500 to 50 kHtz. The circuit of FIG. 6 suppressed the noise signal at the 500 Hz frequency to a level of 4 volts, peak-to-peak, and at the higher frequencies to a level of 1 to 1½ volts peak-to-peak.

Figure 10:
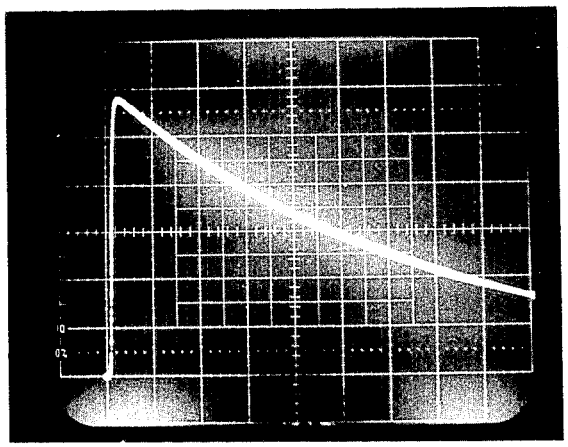
FIG. 10 is in a oscilloscope trace of an IEEE-587 Category B 1.2×50 impulse-simulated transient.
Figure 10A:
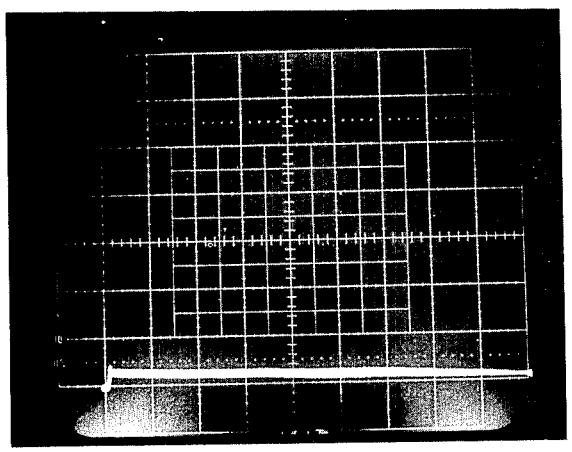
FIGS. 10a–10b are oscilloscope traces which demonstrate the manner in which the circuits of FIGS. 3 and 6, respectively, suppress the 1.2×50 Category B impulse-simulated transient.
Figure 10B:
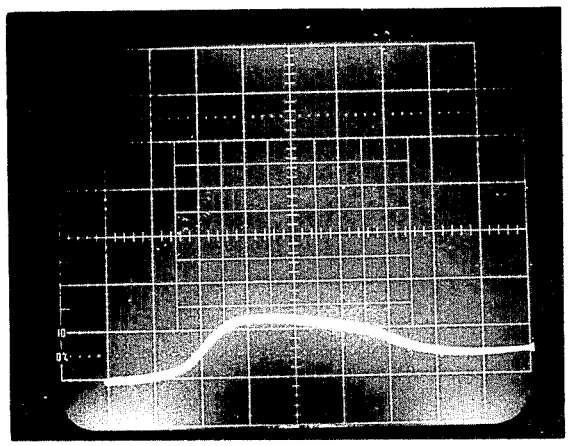
Figure 11:
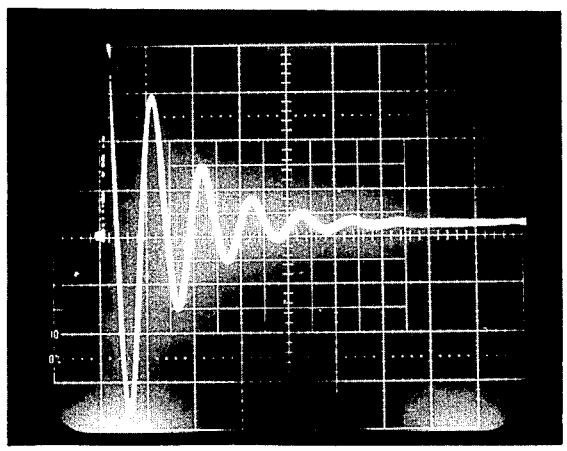
FIG. 11 is an oscilloscope trace showing an IEEE-587 Category B 0.5100 kHz ringwave-simulated transient.
Figure 12:
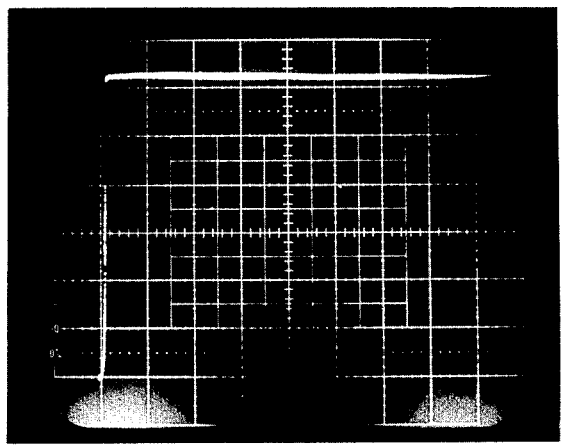
FIG. 12 is an oscilloscope trace of an IEEE-587 Category B 8×20 impulse-simulated transient.

FIGS. 10-10b, 11-11b and 12-12b show several examples which demonstrate the highly effective suppression provided by the apparatus and method of the present invention. FIGS. 10, 11 and 12, respectively, are oscillograph traces which show the typical IEEE-587 category B simulated transients. FIG. 10 shows a simulated 1.2×50 impulse transient. FIG. 11 shows a 0.5/100 KHz ringwave, and FIG. 12 shows an 8×20 impulse transient. In each instance, the volts per division on the vertical scale are 1,000 volts per division, and the horizontal scale represents time with each division representing 10 microseconds.

Figure 11A:
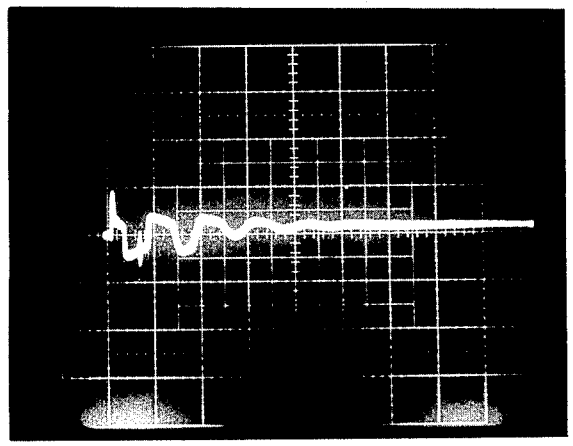
FIGS. 11a–11b are oscilloscope traces which demonstrate the manner in which the circuits of FIGS. 3 and 6 suppress the IEEE-587 Category B 0.5/100 KHz ringwave.
Figure 11B:
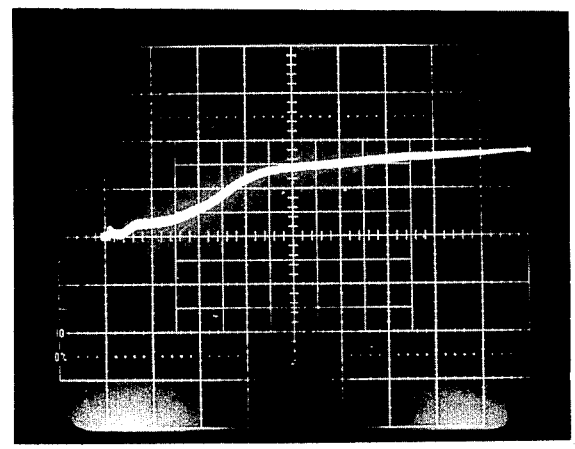
Figure 12A:
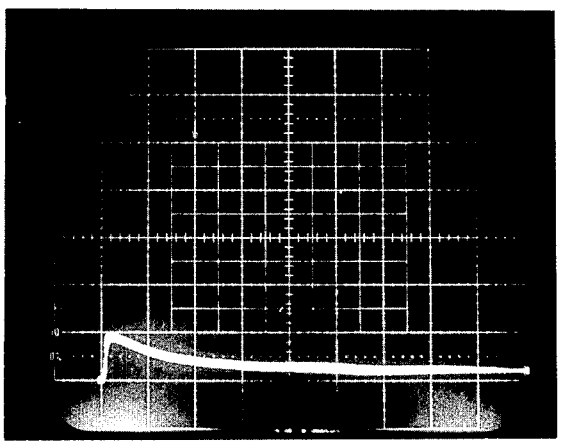
FIGS. 12a–12b are oscilloscope traces demonstrating the manner in which the circuits of FIGS. 3 and 6, respectively, suppress the IEEE-587 Category B 8×20 impulse simulated transient.
Figure 12B:
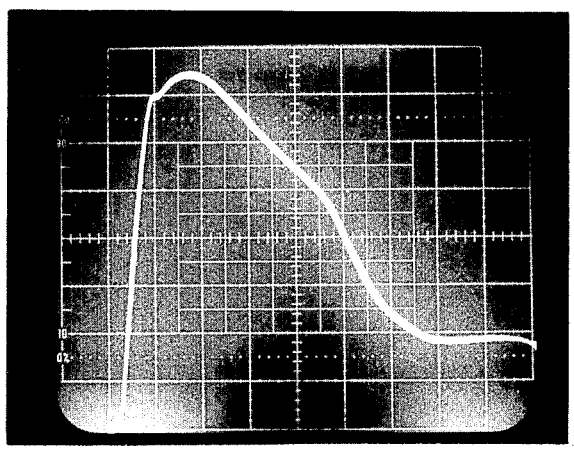

FIGS. 10a, 11a and 12a, respectively, each illustrate the manner in which the presently preferred embodiment as described above in connection with the circuit of FIG. 3 operates to suppress the category B simulated transients. In FIG. 10a (Example 1), the 1.2×50 6,000 volt, 500 amp simulated impulse transient is clamped to a level of approximately 500 volts with little or no harmonic distortion. In FIG. 11a (Example 3), the IEEE-587 category B ringwave is suppressed by the circuit of FIG. 3 to a level of approximately 800 volts, peak to peak, again with little or no harmonic distortion. In FIG. 12a (Example 5), the most severe simulated transient, an IEEE-587 category B 8×20 6,000 volt, 3,000 amp impulse, is suppressed to a level of 1,000 volts with very little or no harmonic distortion.

Similarly, FIGS. 10b-12b illustrate the highly effective suppression which results from using the preferred embodiment of the circuit for FIG. 6 as described above. In FIG. 10b (Example 2), the 1.2×50 impulse transient is virtually eliminated without causing any significant harmonic distortion or other disturbance. (The rise or hump in the oscilloscope trace is a result of charging capacitors, not the transient.) Similarly, in FIG. 11b (Example 4), the circuit of FIG. 3 has clamped the IEEE-587 category B ringwave transient so as to virtually eliminate any discernible destructive voltage level as well as virtually eliminating any harmonic distortion or other line disturbance. in FIG. 12b the circuit of FIG. 6 has clamped the most severe simulated transient, the IEEE-587 category B 8×20 impulse to a level of only approximately 700 volts with little or no harmonic distortion.

From the foregoing examples, it can be appreciated that the transient-suppression network of the present invention provides highly effective protection against potentially disruptive and damaging transients as well as a highly efficient line conditioning network which minimizes distortion and which may be created when suppressing the transient. It is also important to note that in the apparatus and method of the present invention, transient suppression is provided without shunting the transient to ground, i.e., without any crowbar effect.

Figure 7:
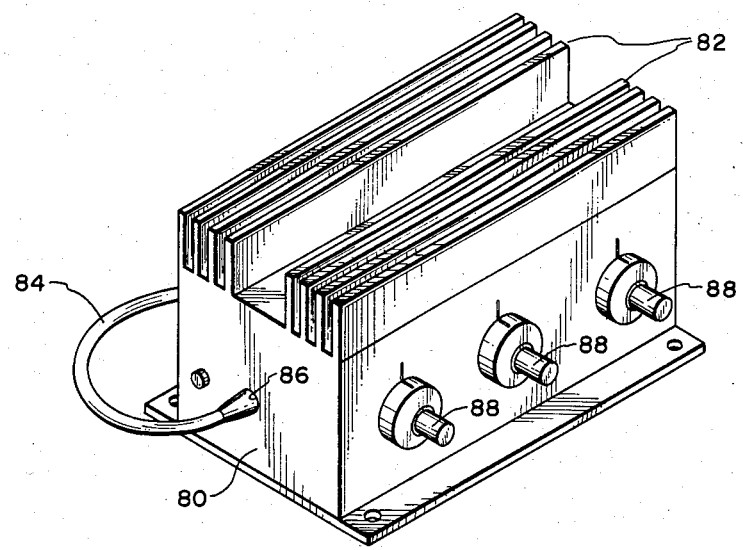
FIG. 7 is a perspective view of another embodiment of a device which embodies the present invention.

In FIG. 7 another embodiment is illustrated in which the case 80 contains three transient-suppression networks such as those illustrated in FIG. 2 or 5. As shown in FIG. 7, case 80 is equipped with fins 82 to facilitate heat dissipation. Although case 80 and fins 82 may be formed of any suitable material, it is presently preferred that case 80 and fins 82 be formed of aluminum. Connecting wires 84 protrude through case 80 through opening 86 and are connected appropriately to the AC power source of the load circuit 34 to be protected. Case 80 additionally holds indicator lamps 88 which indicate a failure of the circuit components of each transient-suppression network in a similar way as indicator lamp 18 of FIG. 1.

Figure 8:
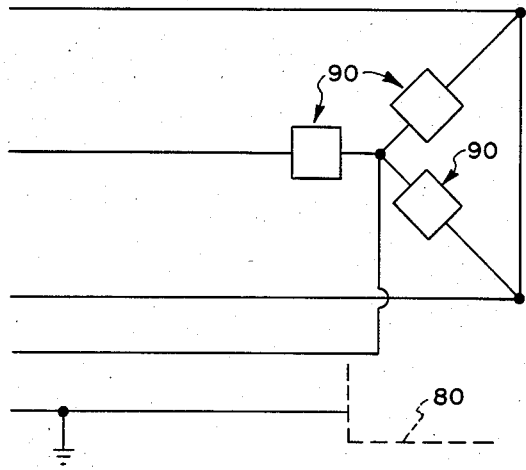
FIG. 8 is a schematic-wiring diagram indicating one presently preferred configuration for utilizing the transient-suppression network of the present invention in a three-phase circuit.

FIG. 8 illustrates one way in which the device of FIG. 7 may be utilized in a delta three-phase circuit. In FIG. 8, each transient-suppression network is generally designated at 90 and is connected in parallel with two legs of a three-phase delta connection. Case 80 is connected to ground. Each transient-suppression network 90 of FIG. 8 corresponds either to the circuit as illustrated in FIG. 2 or FIG. 5, although the various sizes of the circuit elements may vary depending on the voltage level of the three-phase circuit, and transient peak amp absorbing capabilities.

Figure 9:
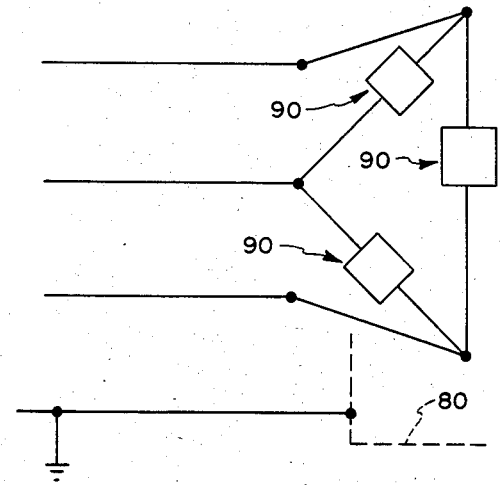
FIG. 9 is a schematic wiring diagram indicating a second presently preferred configuration for utilizing the transient-suppression network of the present invention in a three-phase circuit.

FIG. 9 illustrates a second way of utilizing the apparatus as shown in FIG. 7 in a "Y" or star three-phase circuit. As shown in FIG. 9, each transient-suppression network generally designated at 90 is connected in parallel between one leg of a three-phase "Y" connection, and the neutral leg. As is the case of FIG. 8, each transient-suppression network 90 in FIG. 9 corresponds either to the circuit as shown in FIG. 2 or FIG. 5.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An electrical circuit which suppress electrical transients on an AC power-supply line including a transient voltage and a transient current, said circuit comprising:
    first means for clamping said transient voltage to a predetermined, safe level in less than one nanosecond;
    second means for clamping said transient voltage to a predetermined, safe level and for dissipating higher levels of energy not capable of dissipation by said first means;
    means, connected in series with said first clamping means, for proportionally and non-interruptively limiting said transient current so as to protect said first clamping means from said higher levels of energy; and
    filter means, connected to said first and second means, selected so as to filter harmonic voltage and current caused by clamping said transient voltage by either of said first and second clamping means.

2. An electrical circuit as defined in claim 1 wherein said first means for clamping said transient voltage comprises a silicon-avalanche suppressor connected between a first and a second conductor.

3. A circuit as defined in claim 2 wherein said first means further comprises a metal-oxide varistor connected between said first and second conductors.

4. An apparatus as defined in claim 1 wherein said second means for clamping said transient voltage comprises a metal-oxide varistor.

5. A circuit as defined in claim 1 wherein said filter means comprises a resistor and a capacitor connected in series so as to form an RC filter, said RC filter being connected in parallel across said first and second means for clamping said transient voltage.

6. A circuit as defined in claim 1 wherein said first and second means for clamping said transient voltage are each connected between a hot and a neutral conductor of a power-supply line, and wherein said filter means comprises a first inductor connected in series in said hot conductor between said first and second means for clamping said transient voltage and a second inductor connected in series in said neutral conductor between said first and second means for clamping said transient voltage, and a first capacitor connected in parallel across said first means for clamping said transient voltage and a second capacitor connected in parallel across said second means for clamping said transient voltage.

7. A circuit as defined in claim 1 wherein said first and second means for clamping said transient voltage are each connected between a hot and a neutral conductor of said power-supply line, and wherein said power-supply line further comprises a ground conductor and said circuit further comprises third means, connected to said ground conductor, for clamping transient voltage appearing on said ground conductor.

8. A circuit as defined in claim 7 wherein said third means for clamping said transient voltage is connected in parallel between said ground conductor and said neutral conductor of said power supply line.

9. A circuit as defined in claim 7 wherein said third means for clamping said transient voltage is connected in parallel between said hot conductor and said ground conductor of said power-supply line.

10. A circuit as defined in claims 8 or 9 wherein said third means for clamping said transient voltage comprises a metal-oxide varistor.

11. A circuit as defined in claim 10 wherein said filter means comprises:
    a first inductor connected in series with said hot conductor and connected between said first and second means for clamping said transient voltage;
    a second inductor connected in series with said neutral conductor and connected between said first and second means for clamping said transient voltage;
    a first capacitor connected in parallel across said first means for clamping said transient voltage;
    a second capacitor connected in parallel across said second means for clamping said transient voltage;
    a third capacitor connected between said hot conductor and said ground conductor; and
    a fourth capacitor connected between said ground conductor and said neutral conductor of said power-supply line.

12. An electrical circuit which suppresses load and source-side electrical transients, including a transient voltage, appearing on a hot, neutral or ground conductor of an electrical AC power-supply line, said circuit comprising:
    first means, connected between said hot and neutral conductors, for clamping said transient voltage within one nanosecond to a predetermined, safe level;
    second means, connected between said hot and neutral conductors, for clamping said transient voltage to a predetermined, safe level and for dissipating higher levels of energy not capable of dissipation by said first means;
    third means, connected between said ground conductor and one of said hot and neutral conductors for clamping said transient voltage appearing on said ground conductor; and
    filter means connected to said hot and neutral conductors, and selected so as to filter harmonic voltage and current caused by clamping said transient voltage by any of said clamping means.

13. A circuit as defined in claim 12 wherein said first means for clamping said transient voltage comprises a silicon-avalanche suppressor connected in series with a means for limiting the level of current applied to said silicon-avalanche suppressor.

14. A circuit as defined in claim 13 wherein said first means for clamping said transient voltage further comprises a metal-oxide varistor connected in parallel across said silicon-avalanche suppressor and said means for limiting said current.

15. A circuit as defined in claim 12 wherein said second means for clamping said transient voltage comprises a metal-oxide varistor.

16. A circuit as defined in claim 12 wherein said third means for clamping said transient voltage comprises a metal-oxide varistor.

17. A circuit as defined in claim 16 wherein said metal-oxide varistor is connected between said ground conductor and said neutral conductor of said power-supply line.

18. A circuit as defined in claim 16 wherein said metal-oxide varistor is connected between said hot conductor and said ground conductor of said power-supply line.

19. A circuit as defined in claim 12 wherein said filter means comprises a resistor and a capacitor connected in series so as to form an RC filter.

20. A circuit as defined in claim 19 wherein said filter means comprises a first inductor connected in series with said hot conductor and connected between said first and second means for clamping said transient voltage, a first capacitor connected in parallel across said first means for clamping said transient voltage and a second capacitor connected in parallel across said second means for clamping said transient voltage.

21. A circuit as defined in claim 20 wherein said means for dissipating harmonic voltage and current further comprises a second inductor connected in series in said neutral conductor and connected between said first and second means for clamping said transient voltage.

22. A circuit as defined in claim 21 wherein said means for dissipating harmonic voltage and in current further comprises a third capacitor connected between said hot conductor and said ground conductor of said power-supply line, and a fourth capacitor connected between said ground conductor and said neutral conductor of said power-supply line.

23. An electrical circuit which suppresses source and load-side electrical transients, including a transient voltage, appearing on a hot, neutral or ground conductor of an electrical AC power-supply line, said circuit comprising:
first means, connected between said hot and neutral conductors, for clamping said transient voltage within one nanosecond to a predetermined, safe level;
second means, connected between said hot and neutral conductors, for clamping said transient voltage to a predetermined, safe level and for dissipating higher levels of energy not capable of dissipation by said first means; and
filter means selected so as to filter harmonic voltage and current caused by clamping said transient voltage by either of said first and second clamping means, said filter means comprising a first inductor in series with said hot conductor and connected between said first and second means, a second inductor connected in series with said neutral conductor and connected between said first and second means, and a first capacitor connected in parallel with said first means.

24. A circuit as defined in claim 23 wherein said first means for clamping said transient voltage comprises a resistance connected in series with a silicon-avalanche suppressor.

25. A circuit as defined in claim 24 wherein said first means for clamping said transient voltage further comprises a metal-oxide varistor connected in parallel across said silicon-avalanche suppressor and said series resistance.

26. A circuit as defined in claim 25 wherein said second means for clamping said transient voltage comprises a metal-oxide varistor.

27. A circuit as defined in claim 26 further comprising third means, connected to said ground conductor of said power-supply line, for clamping transient voltage appearing on said ground conductor.

28. A circuit as defined in claim 27 wherein said third means for clamping said transient voltage comprises a metal-oxide varistor.

29. A circuit as defined in claim 28 wherein said metal-oxide varistor of said third means is connected between said ground conductor and said neutral conductor of said power-supply line.

30. A circuit as defined in claim 28 wherein said metal oxide varistor of said third means is connected between said hot conductor and said ground conductor of said power-supply line.

31. A circuit as defined in claims 29 or 30 wherein said filter means further comprises a second capacitor connected with said second means, a third capacitor connected in parallel between said hot conductor and said ground conductor and a fourth capacitor connected between said ground conductor and said neutral conductor of said power-supply line.

32. An electrical circuit which suppresses source and load-side transients appearing on a hot, neutral or ground conductor of an electrical AC power-supply line, said circuit comprising:
a first inductor connected in series with said hot conductor and a second inductor connected in series with said neutral conductor of said power-supply line;
a first clamping stage comprising a silicon-avalanche suppressor connected between said hot and neutral conductors and a metal-oxide varistor connected across said silicon-avalanche suppressor, said silicon-avalanche suppressor and said metal-oxide varistor each being connected on a load side of said first and second inductors, and a resistance connected in series with said silicon-avalanche suppressor so as to limit the level of current applied to said silicon-avalanche suppressor when clamping a transient voltage;
a second clamping stage comprising a metal oxide varistor connected in parallel between said hot and neutral conductors on a source side of said first and second inductors;
a first capacitor connected in parallel across said first clamping stage; and
a second capacitor connected in parallel across said second clamping stage.

33. A circuit as defined in claim 32 further comprising a third clamping stage connected to said ground conductor of said power supply line.

34. A circuit as defined in claim 33 wherein said third clamping stage comprises a metal-oxide varistor.

35. A circuit as defined in claim 35 wherein said metal-oxide varistor of said third clamping stage is connected between said ground conductor and said neutral conductor of said power-supply line.

36. A circuit as defined in claim 34 wherein said metal-oxide varistor of said third clamping stage is connected between said hot conductor and said ground conductor of said power-supply line.

37. A circuit as defined in claims 35 or 36 further comprising a third capacitor connected between said hot conductor and said ground conductor, and a fourth capacitor connected between said ground conductor and said neutral conductor of said power-supply line.

38. A method of suppressing source and load-side transients appearing on an AC power-supply line, said method comprising the steps of:

clamping a transient voltage appearing between hot and neutral conductors of said power-supply line with a first clamping stage, said transient voltage being clamped to a predetermined, safe level within one nanosecond;

limiting transient energy applied to said first clamping stage to a level which is capable of being safely dissipated by said first stage;

clamping said transient voltage with a second clamping stage and thereby dissipating transient energy not capable of dissipation by said first clamping stage; and filtering with a filter means selected so as to filter harmonic voltage and current caused by clamping said transient voltage by either of said first and second clamping stages.

39. A method as defined in claim 38 further comprising the step of clamping the transient voltage appearing on a ground conductor of said power-supply line with a third clamping stage so as to limit the transient voltage on said ground conductor to a predetermined, safe level.

* * * * *